(12) United States Patent
You et al.

(10) Patent No.: US 11,463,941 B2
(45) Date of Patent: Oct. 4, 2022

(54) METHOD FOR ACQUIRING SYSTEM INFORMATION, AND TERMINAL DEVICE AND NETWORK DEVICE

(71) Applicant: GUANGDONG OPPO MOBILE TELECOMMUNICATIONS CORP., LTD., Dongguan (CN)

(72) Inventors: Xin You, Dongguan (CN); Cong Shi, Dongguan (CN); Ning Yang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/932,604

(22) Filed: Jul. 17, 2020

(65) Prior Publication Data
US 2020/0351757 A1 Nov. 5, 2020

Related U.S. Application Data

(63) Continuation of application No. PCT/CN2018/080906, filed on Mar. 28, 2018.

(51) Int. Cl.
*H04W 48/08* (2009.01)
*H04W 74/08* (2009.01)

(52) U.S. Cl.
CPC ....... *H04W 48/08* (2013.01); *H04W 74/0833* (2013.01)

(58) Field of Classification Search
CPC ........... H04W 72/0406; H04W 74/006; H04W 74/008; H04W 74/08; H04W 74/0833;
(Continued)

(56) References Cited

U.S. PATENT DOCUMENTS

2010/0296450 A1* 11/2010 Faniuolo ................. H04L 69/04
370/328
2012/0165058 A1 6/2012 Hwang et al.
(Continued)

FOREIGN PATENT DOCUMENTS

CN 102067705 A 5/2011
CN 102106181 A 6/2011
(Continued)

OTHER PUBLICATIONS

Guangdong Oppo Mobile Telecommunications Corp. Ltd., International Search Report and Written Opinion, PCT/CN2018/080906, dated Dec. 28, 2018, 8 pgs.
(Continued)

*Primary Examiner* — Kan Yuen
(74) *Attorney, Agent, or Firm* — Morgan, Lewis & Bockius LLP

(57) ABSTRACT

Embodiments of the application provide a method for determining system information, and a terminal device and a network device. The method comprises: a terminal device sending a first random access preamble to a network device; the terminal device receiving a media access control (MAC) protocol data unit (PDU) sent by the network device, wherein the MAC PDU comprises at least one random access response (RAR); and the terminal device determining, according to the at least one RAR, system information to be sent by the network device.

6 Claims, 3 Drawing Sheets

200

A terminal device sends a first random access preamble to a network device — S210

The terminal device receives a media access control (MAC) protocol data unit (PDU) sent by the network device, wherein the MAC PDU comprises at least one random access response (RAR) — S220

The terminal device determines, according to the at least one RAR, system information to be sent by the network device — S230

(58) Field of Classification Search
CPC ... H04W 80/02; H04W 74/002; H04W 48/08; H04W 48/12; H04W 48/14; H04L 69/322; H04L 69/22
See application file for complete search history.

(56) References Cited

U.S. PATENT DOCUMENTS

| | | | | |
|---|---|---|---|---|
| 2016/0323917 | A1* | 11/2016 | Hwang | H04W 74/0833 |
| 2016/0330768 | A1* | 11/2016 | Hu | H04W 74/0833 |
| 2017/0094688 | A1 | 3/2017 | Lee et al. | |
| 2017/0251500 | A1* | 8/2017 | Agiwal | H04W 4/06 |
| 2017/0332372 | A1 | 11/2017 | Lee et al. | |
| 2018/0034515 | A1* | 2/2018 | Guo | H04B 7/0686 |
| 2018/0049244 | A1* | 2/2018 | Lee | H04W 76/27 |
| 2018/0199266 | A1* | 7/2018 | Pantelidou | H04W 72/0446 |
| 2018/0220288 | A1* | 8/2018 | Agiwal | H04W 48/12 |
| 2018/0317263 | A1* | 11/2018 | Ishii | H04W 74/0833 |
| 2018/0343673 | A1* | 11/2018 | Chen | H04W 74/006 |
| 2018/0359784 | A1* | 12/2018 | Agiwal | H04W 74/0833 |
| 2019/0068427 | A1* | 2/2019 | Hwang | H04L 5/0092 |
| 2019/0166622 | A1* | 5/2019 | Kim | H04W 74/004 |
| 2019/0174554 | A1* | 6/2019 | Deenoo | H04W 8/22 |
| 2019/0215706 | A1* | 7/2019 | Tsai | H04W 74/0833 |
| 2019/0335512 | A1* | 10/2019 | Shi | H04W 74/02 |
| 2020/0178318 | A1* | 6/2020 | Yu | H04W 74/08 |
| 2020/0275491 | A1* | 8/2020 | Ren | H04L 5/0007 |

FOREIGN PATENT DOCUMENTS

| | | |
|---|---|---|
| CN | 103813271 A | 5/2014 |
| CN | 106792998 A | 5/2017 |
| CN | 107223353 A | 9/2017 |
| CN | 107624255 A | 1/2018 |
| KR | 20180018313 A | 2/2018 |
| WO | WO2010/016726 A2 | 2/2010 |

OTHER PUBLICATIONS

3GPP TS 38.321, V15.0.0 (Dec. 2017), 3rd Generation Partnership Project; Technical Specification Group Radio Access Network; NR; Medium Access Control (MAC) protocol specification (Release 15), 55 pgs.

3GPP TS 38.331, V15.0.0 (Dec. 2017), 3rd Generation Partnership Project; Technical Specification Group Radio Access Network; NR; Radio Resource Control (RRC) protocol specification (Release 15), 188 pgs.

Asustek, "Random access response format with back-off control," 3GPP TSG-RAN WG2 #61, R2-080904, Feb. 11-15, 2008, Sorrento, Italy, 6 pgs.

Guangdong OPPO Mobile Telecommunications Corp. Ltd., Extended European Search Report, EP18911440.8, dated Dec. 10, 2020, 10 pgs.

Lenovo et al., "MAC PDU format for Random Acess Response," 3GPP TSG-RAN WG2 Meeting #99bis, R2-1711028, Prague, Czech Republic, Oct. 9-13, 2017, 2 pgs.

Ericsson, "RAR Design and Contents," 3GPP TSG-RAN WG2 #99bis, Tdoc R2-1711174, Prague, Czech Republic, Oct. 9-13, 2017, 4 pgs.

Guangdong OPPO Mobile Telecommunications Corp. Ltd., Communication Pursuant to Article 94(3), EP18911440.8, dated Jul. 2, 2021, 9 pgs.

Guangdong OPPO Mobile Telecommunications Corp. Ltd., First Office Action, CN202010291829.7, dated Jun. 22, 2021, 24 pgs.

Guangdong OPPO Mobile Telecommunications Corp. Ltd., Second Office Action, CN202010291829.7, dated Aug. 23, 2021, 21 pgs.

Guangdong OPPO Mobile Telecommunications Corp. Ltd., Third Office Action, CN202010291829.7, dated Oct. 27, 2021, 28 pgs.

Guangdong OPPO Mobile Telecommunications Corp. Ltd., Communication Pursuant to Article 94(3), EP18911440.8, dated Dec. 15, 2021, 11 pgs.

Guangdong OPPO Mobile Telecommunications Corp. Ltd., Notification to Grant Patent Right for Invention, CN202010291829.7, dated Jan. 28, 2022, 7 pgs.

Guangdong OPPO Mobile Telecommunications Corp. Ltd., Examination Report, IN20202705214, dated Dec. 3, 2021, 6 pgs.

Guangdong OPPO Mobile Telecommunications Corp. Ltd., Notice of Reasons for Refusal, JP2020-542429, dated Jan. 18, 2022, 6 pgs.

Guangdong OPPO Mobile Telecommunications Corp. Ltd., Notification of Reason for Refusal, KR10-20207023222, dated Dec. 31, 2021, 10 pgs.

Guangdong OPPO Mobile Telecommunications Corp. Ltd., Notice of Reasons for Refusal, JP2020-542429, dated Apr. 26, 2022, 10 pgs.

* cited by examiner

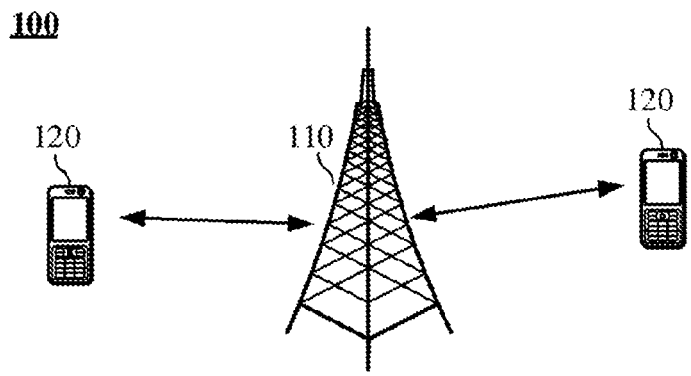
Fig.1
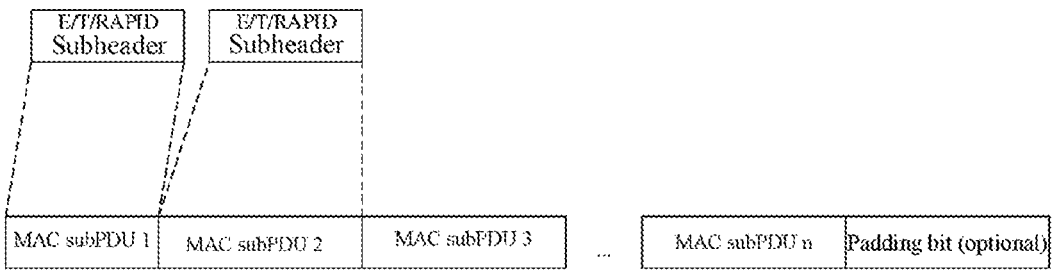
Fig.2
Fig.3

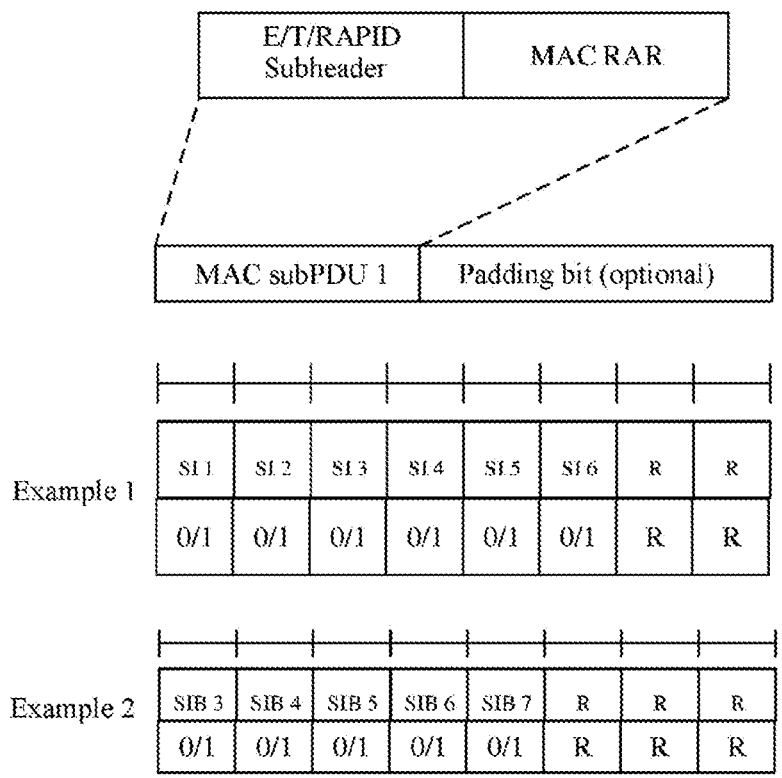
Fig.4
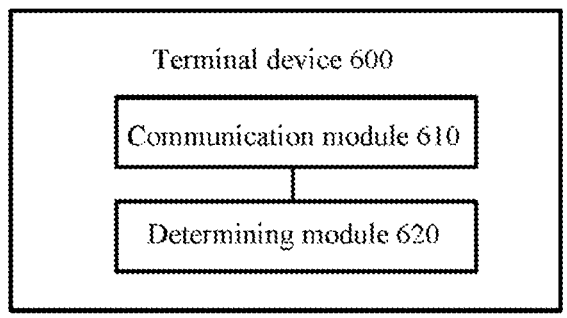
Fig.5
Fig.6

METHOD FOR ACQUIRING SYSTEM INFORMATION, AND TERMINAL DEVICE AND NETWORK DEVICE

CROSS-REFERENCE TO RELATED APPLICATION

This application is a continuation of PCT Application No. PCT/CN2018/080906, filed Mar. 28, 2018, the entire contents of which are incorporated herein by reference.

TECHNICAL FIELD

The embodiments of the present application relate to the field of communications, and more specifically, to a method for acquiring system information, a terminal device, and a network device.

BACKGROUND

In a 5G New Radio (NR) system, when a terminal device needs to access the network, it needs to acquire system information (SI) from the network, for example, Remaining Minimum System Information (RMSI), where the RMSI may include a master information block (MIB), a system information block 1 (SIB1), and a system information block 2 (SIB2).

In this NR system, the terminal device can acquire the MIB through the Physical Broadcast Channel (PBCH) and acquire the SIB1 and SIB2 through the Physical Downlink Shared Channel (PDSCH). Other SI except the RMSI may be acquired through the random access process. Therefore, how to acquire the system information through the random access process is a question worthy of research.

SUMMARY

There are provided a method for acquiring system information, a terminal device, and a network device, which can acquire the system information according to a random access response (RAR).

In a first aspect, there is provided a method for acquiring system information, including: sending, by a terminal device, a first random access preamble to a network device; receiving, by the terminal device, a media access control (MAC) protocol data unit (PDU) sent by the network device, the MAC PDU including at least one random access response (RAR); and determining, by the terminal device, system information to be sent by the network device according to the at least one RAR.

Therefore, the terminal device can send a random access preamble for requesting system information to the network device through a random access process. Further, the network device can reply to the terminal device with a MAC PDU, which includes at least one RAR, so that the terminal device can determine the system information to be sent by the network device according to the at least one RAR, and can receive the system information.

Optionally, the system information to be sent by the network device may include system information to be broadcast on the network and/or system information sent by the network device through high-level signaling (for example, Radio Resource Control (RRC) signaling). The embodiments of the present application do not specifically limit the specific manner in which the network device sends the system information.

Optionally, the first random access preamble may be used to notify the network device that the random access initiated by the terminal device is used to request system information, or the first random access preamble may be used to indicate that the terminal device wants to acquire system information through random access.

Optionally, the first random access preamble may be a specific Preamble for requesting system information. If the first random access preamble received by the network device is the specific Preamble, it can be determined that the random access initiated by the terminal device is used to request system information. The specific Preamble may include one or more, which is not limited in the embodiments of the present application.

Optionally, the first random access preamble is used to indicate system information that the terminal device requests to acquire.

Optionally, a resource (that is, a Physical Random Access Channel (PRACH) resource) used by the terminal device to send the first random access preamble may be used to indicate the system information requested by the terminal device to acquire. Therefore, the network device can determine the target system information that the terminal device wants to acquire according to the PRACH resource used by the terminal device for sending the first random access preamble.

In some possible implementation manners, the sending, by the terminal device, the first random access preamble to the network device includes: sending, by the terminal device, the first random access preamble to the network device within a specific period.

Therefore, the network device can determine that the random access initiated by the terminal device is used to request the system information based on at least one of the random access preamble sent by the terminal device, or a resource used to send the random access preamble, or a time to send the random access preamble. That is, at least one of the random access preamble sent by the terminal device, the resource used to send the random access preamble, or the time to send the random access preamble can be used to indicate that the random access initiated by the terminal device is used to request system information.

In some possible implementation manners, the specific period is configured by the network device, or is determined according to a modification period of system information.

In some possible implementation manners, the method further includes: decoding, by the terminal device, the MAC PDU according to a specific random access wireless network temporary identity (RA-RNTI).

In some possible implementation manners, the specific RA-RNTI is a reserved RA-RNTI configured by the network device.

In some possible implementation manners, the specific RA-RNTI is configured by the network device through system information or radio resource control (RRC) signaling.

In some possible implementation manners, the at least one RAR includes indication information, where the indication information is used to indicate system information to be sent by the network device.

In some possible implementation manners, the determining, by the terminal device, system information to be sent by the network device according to the at least one RAR includes: determining, by the terminal device, the system information to be sent by the network device according to the indication information included in the at least one RAR.

In some possible implementation manners, the indication information is at least one random access preamble identifier (RAPID), and each RAPID in the at least one RAPID is used to indicate at least one system information.

In some possible implementation manners, the MAC PDU includes at least one MAC subPDU, the at least one MAC subPDU corresponds to the at least one RAR, each RAPID is carried in a subheader of the MAC subPDU corresponding to each RAR, and the MAC subPDU does not include a payload part.

Therefore, the terminal device can determine the system information to be sent by the network device through at least one RAPID carried in the MAC PDU returned by the network device. Further, the terminal device can receive the system information. For example, the terminal device can perform receiving of the system information according to its own requirements, or can receive all system information, which is not limited in the embodiments of the present application.

In some possible implementation manners, the indication information indicates the system information to be sent by the network device in a bitmap manner.

In some possible implementation manners, the indication information is carried in a payload part of the MAC subPDU.

In some possible implementation manners, a subheader (sub-packet header) of the MAC subPDU further includes a RAPID, which is used to indicate a random access preamble corresponding to the at least one RAR.

According to a second aspect, there is provided a method for acquiring system information, including: receiving, by a network device, a first random access preamble sent by a first terminal device, the first random access preamble being configured to request to acquire system information; and replying, by the network device, a Media Access Control (MAC) protocol data unit (PDU), wherein the MAC PDU includes at least one random access response (RAR), and the at least one RAR is configured to determine system information to be sent by the network device.

Therefore, the network device can receive the random access preamble used by the terminal device to request system information. Further, the network device can reply to the terminal device with a MAC PDU. The MAC PDU may include at least one RAR, so that the terminal device can determine the system information to be sent by the network device based on the at least one RAR. Further, the system information can be received.

In some possible implementation manners, the at least one RAR includes indication information, where the indication information is used to indicate the system information to be sent by the network device.

In some possible implementation manners, the indication information is at least one RAPID, and each RAPID in the at least one RAPID is used to indicate at least one system information.

In some possible implementation manners, the MAC PDU includes at least one MAC subPDU, the at least one MAC subPDU corresponds to the at least one RAR, each RAPID is carried in a subheader of the MAC subPDU corresponding to each RAR, and the MAC subPDU does not include a payload part.

In some possible implementation manners, the indication information indicates the system information to be sent by the network device in a bitmap manner.

In some possible implementation manners, the indication information is carried in a payload part of the MAC subPDU.

In some possible implementation manners, a subheader of the MAC subPDU further includes a RAPID, which is used to indicate a random access preamble corresponding to the at least one RAR.

In some possible implementation manners, the method further includes: encoding, by the network device, the MAC PDU according to a specific random access radio network temporary identification (RA-RNTI).

In some possible implementation manners, the receiving, by the network device, the first random access preamble sent by the first terminal device includes: receiving, by the network device, the first random access preamble sent by the first terminal device within a specific period.

In some possible implementation manners, the method further includes:

receiving, by the network device, a second random access preamble sent by a second terminal device within the specific period, where the second random access preamble is used to request the system information, and the at least one RAR includes a response of the network device to the second random access preamble sent by the second terminal device.

In some possible implementation manners, the specific period is configured by the network device, or is determined according to a modification period of system information.

According to a third aspect, there is provided a terminal device to execute the method in the foregoing first aspect or any possible implementation manners of the first aspect. Specifically, the terminal device includes a unit for performing the method in the foregoing first aspect or any possible implementation manners of the first aspect.

According to a fourth aspect, there is provided a terminal device. The terminal device includes: a memory, a processor, an input interface, and an output interface. The memory, the processor, the input interface and the output interface are connected through a bus system. The memory is configured to store instructions, and the processor is configured to execute the instructions stored in the memory, and configured to execute the method in the foregoing first aspect or any possible implementation manners of the first aspect.

According to a fifth aspect, there is provided a network device for performing the method in the foregoing second aspect or any possible implementation manners of the second aspect. Specifically, the network device includes a unit for performing the method in the foregoing second aspect or any possible implementation manners of the second aspect.

According to a sixth aspect, there is provided a network device. The network device includes: a memory, a processor, an input interface, and an output interface. The memory, the processor, the input interface and the output interface are connected through a bus system. The memory is configured to store instructions, and the processor is configured to execute the instructions stored in the memory, and used to execute the method in the foregoing second aspect or any possible implementation manners of the second aspect.

According to a seventh aspect, there is provided a computer storage medium for storing computer software instructions for executing the method in the first aspect or any possible implementation manners of the first aspect, where the computer software instructions includes a program designed to execute the foregoing aspects.

According to an eighth aspect, there is provided a computer program product including instructions, which when executed on a computer, causes the computer to execute the method in the first aspect or any optional implementation manners of the first aspect.

According to a ninth aspect, there is provided a computer storage medium for storing computer software instructions for executing the method in the second aspect or any possible implementation manners of the second aspect, where the computer software instruction includes a program designed to execute the foregoing aspects.

According to a tenth aspect, there is provided a computer program product including instructions, which when executed on a computer, causes the computer to execute the method in the second aspect or any optional implementation manners of the second aspect.

BRIEF DESCRIPTION OF THE DRAWINGS

FIG. 1 is a schematic diagram of an application scenario according to an embodiment of the present application.

FIG. 2 shows a schematic flowchart of a method for acquiring system information according to an embodiment of the present application.

FIG. 3 shows an example of the indication information according to the embodiment of the present application.

FIG. 4 shows another example of the indication information according to the embodiment of the present application.

FIG. 5 shows a schematic flowchart of a method for acquiring system information according to another embodiment of the present application.

FIG. 6 shows a schematic block diagram of a terminal device according to an embodiment of the present application.

DETAILED DESCRIPTION

Figure 7:
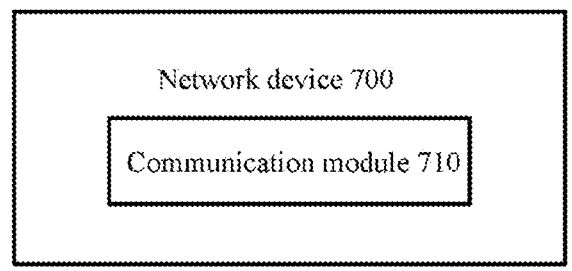
FIG. 7 shows a schematic block diagram of a network device according to another embodiment of the present application.

The technical solutions in the embodiments of the present application will be described below with reference to the drawings.

The technical solutions of the embodiments of the present application may be applied to various communication systems, for example, a Global System of Mobile communication ("GSM") system, a Code Division Multiple Access ("CDMA") system, a Wideband Code Division Multiple Access ("WCDMA") system, General Packet Radio Service ("GPRS"), a Long Term Evolution ("LTE") system, a LTE Frequency Division Duplex ("FDD") system, LTE Time Division Duplex ("TDD"), a Universal Mobile Telecommunication System ("UMTS"), a Worldwide Interoperability for Microwave Access ("WiMAX") communication system or future 5G systems or the like.

FIG. 1 shows a wireless communication system 100 applied in an embodiment of the present application. The wireless communication system 100 may include a network device 110. The network device 100 may be a device that communicates with a terminal device. The network device 100 may provide communication coverage for a specific geographic area, and may communicate with a terminal device (such as a UE) located within the coverage area. Optionally, the network device 100 may be a Base Transceiver Station (BTS) in a GSM system or a CDMA system, a NodeB (NB) in a WCDMA system, or an Evolutional Node B (eNB or eNodeB) in an LTE system, or a radio controller in a Cloud Radio Access Network (CRAN), or the network device may be a relay station, an access point, an in-vehicle device, a wearable device, a network-side equipment in the future 5G network or a network equipment in a future evolved Public Land Mobile Network (PLMN), or the like.

The wireless communication system 100 further includes at least one terminal device 120 located within the coverage area of the network device 110. The terminal device 120 may be mobile or fixed. Optionally, the terminal device 120 may refer to an access terminal, User Equipment (UE), a user unit, a user station, a mobile station, a mobile platform, a remote station, a remote terminal, a mobile device, a user terminal, a terminal, a wireless communication device, a user agent, or a user apparatus. The access terminal may be a cell phone, a cordless phone, a Session Initiation Protocol (SIP) phone, a Wireless Local Loop (WLL) station, a Personal Digital Assistant (PDA), and a handheld device and a computing device having wireless communication function, or other processing devices connected to a wireless modem, an in-vehicle device, a wearable device, a terminal device in future 5G network, or a terminal device in future evolved PLMN.

FIG. 2 is a schematic flowchart of a method for acquiring system information according to an embodiment of the present application. As shown in FIG. 2, the method 200 may include the following steps.

In S210, the terminal device sends a first random access preamble to the network device.

In S220, the terminal device receives a media access control (MAC) protocol data unit (PDU) sent by the network device, where the MAC PDU includes at least one random access response (RAR).

In S230, the terminal device determines system information to be sent by the network device according to the at least one RAR.

Optionally, in some embodiments, the first random access preamble may be used to notify the network device that the random access initiated by the terminal device is used to request system information, or the first random access preamble may be used to indicate that the terminal device wants to acquire system information through random access. Therefore, the terminal device may send a random access preamble for requesting system information to the network device through a random access process. Further, the network device may reply to the terminal device with a Media Access Control (MAC) Protocol Data Unit (PDU). The MAC PDU includes at least one RAR, so that the terminal device can determine system information to be sent by the network device according to the at least one RAR. Further, the terminal device can receive the system information. For example, the terminal device can receive the system information according to its own needs.

Optionally, the system information to be sent by the network device may include system information to be broadcast on the network and/or system information sent by the network device through high-level signaling (for example, Radio Resource Control (RRC) signaling). The embodiment of the present application does not specifically limit the specific manner in which the network device sends the system information.

Optionally, in some embodiments, the first random access preamble may be a specific preamble used to request system information. If the first random access preamble received by the network device is a specific preamble, it can be determined that the random access initiated by the terminal device is used to request system information. There may be one or more the specific preambles, which is not limited in the embodiments of the present application.

Optionally, in some embodiments, the first random access preamble sent by the terminal device may be used to indicate target system information requested by the terminal device, so that the network device may determine the target system information that the terminal device wants to acquire according to the first random access preamble sent by the terminal device, and then the system information may be received.

Optionally, in some embodiments, the random access preamble may be used to indicate one or a group of system information, or in other words, the random access preamble and the system information may have a corresponding relationship. Therefore, different random access preambles may indicate different system information.

Optionally, in some embodiments, the resource (that is, the Physical Random Access Channel (PRACH) resource) used by the terminal device to send the first random access preamble may be used to indicate the system information requested by the terminal device, so that the network device may determine the target system information that the terminal device wants to acquire according to the PRACH resource used by the terminal device to send the first random access preamble.

For example, the PRACH resource used by the terminal device to send the random access preamble may be used to indicate one or a group of system information, or the PRACH resource for sending the random access preamble and the system information may have a corresponding relationship. Different PRACH resources may indicate corresponding system information.

Optionally, in some embodiments, the PRACH resource used by the terminal device to send the random access preamble for requesting system information may also be a specific PRACH resource. Therefore, the network device may determine that the random access initiated by the terminal device is used to request system information by using the PRACH resource.

Optionally, in some embodiments, the S210 may include: the terminal device sending the first random access preamble to the network device within a specific period.

Optionally, in the embodiments of the present application, for the random access initiated by the terminal device within the specific period, the network device may consider it as a random access used to request system information, or the network device may determine whether this random access is used for requesting the system information according to the time when the device sends the random access preamble. If the random access preamble is sent within this specific period, the network device may consider it to be used to request system information; otherwise, the network device may consider it as a normal random access process.

In this specific period, the network device may receive the random access preamble sent by at least one terminal device, or in other words, in the specific period, the network device may collect the random access preamble(s) sent by at least one terminal device. Further, after the specific period, the network device may reply with a Random Access Response (RAR), and the RAR may include a response to the random access preamble sent by the at least one terminal device, that is, the network device may encapsulate the response for the random access preamble of at least one terminal device in one RAR and send it, that is, the response for the random access preamble of at least one terminal device is sent through one RAR, therefore the signaling overhead can be reduced.

Optionally, in the embodiments of the present application, the specific period is configured by the network device, or determined according to a modification period of the system information, or specified by the communication system, or preset on the terminal device, which is not limited in the embodiments of the present application.

Optionally, the specific period may be a period of time after the modification period of the system information, or a period of time before the modification period of the system information, or a period of time within the modification period of the system information, etc., which is not limited by the embodiments of the present application.

Therefore, the network device may determine that the random access initiated by the terminal device is used to request the system information based on at least one of the random access preamble sent by the terminal device, the resource used to send the random access preamble, or the time to send the random access preamble. That is, at least one of the random access preamble sent by the terminal device, the resource used to send the random access preamble, or the time to send the random access preamble may be used to indicate that the random access initiated by the terminal device is used to request system information.

For example, the network device may determine that the random access initiated by the terminal device is used to request system information when the random access preamble sent by the terminal device is a specific preamble, or when the time to send the random access preamble falls within the specific period.

After S210, further, the terminal device may listen to the PDCCH and acquire the RAR replied by the network device.

Optionally, the time-frequency resource location where the Physical Downlink Control Channel (PDCCH) is located may be indicated by Control Resource Set (CORSET) information. Therefore, the terminal device may listen to the PDCCH on the resource indicated by the CORSET and acquire the RAR replied by the network device.

Optionally, in some embodiments, the MAC PDU received by the terminal device from the network device may be after the specific period, that is, the MAC PDU returned by the network device may include a response to the random access preamble sent by at least one terminal device within the specific period.

Optionally, since the MAC PDU returned by the network device may include a response to the random access preamble of at least one terminal device within the specific period, in order to facilitate different terminal devices to decode the MAC PDU, the network device may use a specific identifier (such as a Random Access Radio Network Temporary Identifier (RA-RNTI)) to encode the MAC PDU, so that the terminal device receiving the MAC PDU may also use the specific identifier, for example, the specific RA-RNTI, to decode the MAC PDU and acquire the RAR included in the MAC PDU.

Optionally, in the embodiments of the present application, the specific RA-RNTI used to decode the MAC PDU is a reserved RA-RNTI. The reserved RA-RNTI may be configured by the network device or prescribed by the communication system, which is not limited by the embodiments of the present application. Alternatively, the specific RA-RNTI may be other RA-RNTI, as long as it does not affect the existing functions of the RA-RNTI.

It should be understood that the value of the specific RA-RNTI may be different from the value of other RA- RNTI used for random access, or that the value of the specific RA-RNTI is not included in the value range of other RA-RNTI. That is, the specific RA-RNTI is not used for the normal random access procedure.

Optionally, the specific RA-RNTI is configured by the network device through system information (for example, SIB1 or SIB2) or Radio Resource Control (RRC) signaling, or through other signaling, for example, the specific RA-RNTI is configured by the physical layer signaling, which is not limited in the embodiments of the present application.

After the terminal device decodes the MAC PDU, further, the system information to be sent by the network device may be determined according to at least one RAR included in the MAC PDU.

Optionally, in some embodiments, the at least one RAR may include indication information for indicating system information to be sent by the network device. Optionally, the indication information may be explicit or implicit indication information. For example, the indication information may indicate an identifier or an index of system information to be sent by the network device, and the embodiments of the present application do not specifically limit the indication manner of the indication information.

The following describes the indication manner of the indication information in combination with specific embodiments.

First embodiment: the indication information is at least one random access preamble identifier (RAPID), where each RAPID in the at least one RAPID is used to indicate at least one system information.

In the first embodiment, each RAR may include a Random Access Preamble Identifier (RAPID), and the RAPID included in each RAR may be used to indicate one or more system information to be sent by the network device.

Optionally, in the first embodiment, the MAC PDU may include at least one MAC subPDU, the at least one MAC subPDU corresponds to the at least one RAR, the RAPID included in each RAR is carried in a subheader of the MAC subPDU corresponding to each RAR, and the MAC subPDU does not include a data (payload) part.

It should be understood that, in the embodiments of the present application, the correspondence between one MAC subPDU and one RAR may be understood as that the MAC subPDU is the RAR itself, or it can also be understood that one RAR is carried in one MAC subPDU.

Optionally, in this embodiment, the MAC subPDU corresponding to each RAR may include only a subheader and does not include a payload part. In this case, the RAPID included in each RAR may be carried in the subheader of the MAC subPDU; or the MAC subPDU corresponding to each RAR may also include a subheader and a payload part. In this case, the RAPID may be carried in the subheader of the MAC subPDU or carried in the payload of the MAC subPDU, which is not limited in the embodiments of the present application.

Optionally, in the embodiments of the present application, the MAC PDU may further include a backoff indicator (BI) indication field. Generally, the BI indication field is located in the first MAC subPDU of the MAC PDU.

The first embodiment is described with reference to FIG. 3. In the embodiment shown in FIG. 3, the MAC PDU may include n RARs, denoted as RAR1 to RARn, corresponding to MAC subPDU 1 to MAC subPDU n, respectively. Each MAC subPDU may include a subheader part. The RAPID included in each RAR may be carried in the subheader of the corresponding MAC subPDU. For example, RAPID1 included in RAR1 may be carried in the subheader of MAC subPDU1, and RAPIDn included in RARn may be carried in the subheader of MAC subPDUn. Therefore, the terminal device may determine the system information to be sent by the network device according to the RAPID included in each MAC subPDU.

It should be understood that, in FIG. 3, the meanings of the fields in the subheader of the MAC subPDU are as follows:

E: an extended field, used to indicate whether there is other field in the MAC header;

T: a type field, used to indicate whether the MAC subheader contains RAPID or BI;

R: a reserved bit, which may be set to "0";

BI: a backoff indicator indication field, used to indicate the maximum waiting time for the terminal device to re-initiate random access;

RAPID: used to indicate the random access preamble that has been sent.

Optionally, in the example shown in FIG. 3, the MAC PDU may further include MAC subPDU 0, which is located in the first MAC subPDU of the MAC PDU and is used to carry a BI indication field.

Optionally, in the example shown in FIG. 3, the MAC PDU may further include a padding bit, for example, a zero bit or a reserved bit.

Therefore, the terminal device may determine the system information to be sent by the network device through at least one RAPID carried in the MAC PDU returned by the network device. Alternatively, the system information to be sent by the network device may be determined by the network device according to the request of at least one terminal device. For example, the system information to be sent may be determined according to a random access preamble sent by at least one terminal device in a specific period. Alternatively, the system information to be sent may include some or all of the system information requested by at least one terminal device in the specific period, or may include other SI, which is not limited in the embodiments of the present application.

After the terminal device determines which system information will be broadcast by the network device in the future, further, the terminal device may receive the system information, for example, the terminal device may receive the system information according to its own requirements. It is not specifically limited by the embodiments of the present application which system information is received by the terminal device.

Optionally, the terminal device may receive only the system information that it requests to acquire, or may also receive system information other than the system information that it requests to acquire, for example, the terminal device requests to acquire SIB3, and subsequently the network device broadcasts SIB3 and SIB4, then the terminal device may only receive SIB1, or the terminal device may receive SIB3 and SIB4 according to its own requirements.

Second embodiment: the indication information indicates system information to be sent by the network device in a bitmap manner.

That is, the network device may directly indicate the system information to be sent in a bitmap manner.

Optionally, in the second embodiment, the MAC PDU may include only one RAR. In this case, the indication information included in the RAR may be carried in one MAC subPDU (recorded as Case 1). For example, the MAC PDU includes one RAR, which may correspond to MAC subPDU1, then the indication information included in the RAR may be carried in the MAC subPDU1, and the indication information may indicate whether a plurality of system information (for example, SIB3 SIB6) will be broadcast subsequently in the bitmap manner.

Alternatively, the MAC PDU may also include a plurality of RARs. In this case, the MAC PDU may include a plurality of MAC subPDUs corresponding to the plurality of RARs. The MAC subPDU corresponding to each RAR may include one piece of indication information for indicating the system information to be sent by the network device (recorded as Case 2). In this case, optionally, the content indicated by the indication information included in each MAC subPDU may be the same or different, which is not limited in the embodiments of the present application.

For example, the MAC PDU includes n RARs, and the n RARs respectively correspond to MAC subPDU1 to MAC subPDUn, where n is a positive integer greater than 1. In this condition, any of the MAC subPDUs in MAC subPDU1 to MAC subPDUn may include indication information, and the indication information included in the plurality of MAC subPDUs may indicate the same content. For example, the indication information included in the MAC subPDU1 to MAC subPDUn may indicate whether a plurality of system information (for example, SIB3 to SIB6) will be broadcast later in the bitmap manner. Alternatively, the content indicated by the indication information included in each MAC subPDU may also be different. Optionally, the indication information included in each MAC subPDU may be used to indicate whether a corresponding group of SSBs will be broadcast in the future, for example, the indication information included in MAC subPDU1 may be used to indicate whether SIB3~SIB5 will be broadcast in the future, the indication information included in MAC subPDU2 may be used to indicate whether SIB6~SIB7 will be broadcast in the future, and the indication information included in MAC subPDU3 may be used to indicate whether SIB8~SIB10 will be broadcast in the future.

Optionally, the indication information included in each MAC subPDU is used to indicate which SSBs will be broadcast in the future, which may be configured by the network device or specified by the communication system, which is not limited in the embodiments of the present application.

Optionally, in the embodiments of the present application, the indication information included in the RAR may be carried in a subheader or a payload of the MAC subPDU, which is not specifically limited in the embodiments of the present application.

Optionally, in the second embodiment, the MAC PDU may also include a backoff indicator (BI) indication field. Generally, the BI indication field is located in the first MAC subPDU of the MAC PDU.

The second embodiment will be described below with reference to FIG. 4. It should be understood that FIG. 4 is based on Case 1 as an example. For case 2, it may be indicated in a similar manner, and details are not described herein again.

In the example shown in FIG. 4, the MAC PDU includes one RAR corresponding to the MAC subPDU1, and the MAC subPDU1 may include indication information. Alternatively, the indication information may be carried in the payload part (i.e., the MAC RAR) of the MAC subPDU1, and is used to indicate which system information among the plurality of system information will be broadcast.

For example, the indication information may be used to indicate which system information from SI1 to SI6 will be broadcast subsequently (corresponding to Example 1). As an example and not limitation, when the bit corresponding to SI is 1, it can be used to indicate that the SI is the system information to be sent, or when the bit corresponding to the SI is 0, it is used to indicate that the SI is the system information to be sent.

As another example, the indication information may be used to indicate which system information in SIB3~SIB7 will be broadcast subsequently (corresponding to Example 2). As an example and not limitation, when the bit corresponding to the SIB is 1, it may be used to indicate that the SIB is the system information to be sent, or when the bit corresponding to the SIB is 0, it may be used to indicate that the SIB is the system information to be sent.

Optionally, the example shown in FIG. 4 may further include that MAC subPDU 0 is the first MAC subPDU of the MAC PDU and is used to carry BI.

Optionally, in the example shown in FIG. 4, the MAC PDU may further include a padding bit, for example, a zero bit or a reserved bit.

The method for acquiring system information according to the embodiments of the present application is described in detail from the perspective of the terminal device with reference to FIG. 2 to FIG. 4 above. The method for acquiring system information according to another embodiment of the application will be described in detail from the perspective of the network device with reference to FIG. 5 below. It should be understood that the description on the network device side and the description on the terminal device side correspond to each other. Similar descriptions may be referred to above. To avoid repetition, details are not repeated here.

FIG. 5 is a schematic flowchart of a method 500 for acquiring system information according to another embodiment of the present application. The method 500 may be executed by a network device in Internet of Vehicles system shown in FIG. 1. As shown in FIG. 5, the method 500 includes the following steps.

In S510, the network device receives a first random access preamble sent by a first terminal device, where the first random access preamble is configured to request acquisition of system information.

In S520, the network device replies a media access control (MAC) protocol data unit (PDU), where the MAC PDU includes at least one random access response (RAR), and the at least one RAR is configured to determine system information to be sent by the network device.

Optionally, in some embodiments, the at least one RAR includes indication information, and the indication information is used to indicate system information to be sent by the network device.

Optionally, in some embodiments, the indication information is at least one RAPID, where each RAPID in the at least one RAPID is configured to indicate at least one system information.

Optionally, in some embodiments, the MAC PDU includes at least one MAC subPDU, the at least one MAC subPDU corresponds to the at least one RAR, each RAPID is carried in a subheader of MAC subPDU corresponding to each RAR, and the MAC subPDU does not include a payload part.

Optionally, in some embodiments, the indication information indicates system information to be sent by the network device in a bitmap manner.

Optionally, in some embodiments, the indication information is carried in a payload part of the MAC subPDU.

Optionally, in some embodiments, the subheader of the MAC subPDU further includes a RAPID, which is used to indicate a random access preamble corresponding to the at least one RAR.

Optionally, in some embodiments, the method 500 further includes:

the network device encoding the MAC PDU according to a specific random access radio network temporary identification (RA-RNTI).

Optionally, in some embodiments, the receiving, by the network device, the first random access preamble sent by the first terminal device includes:

the network device receiving a first random access preamble sent by the first terminal device within a specific period.

Optionally, in some embodiments, the method 500 further includes:

the network device receiving a second random access preamble sent by a second terminal device within the specific period, where the second random access preamble is used to request system information, and the at least one RAR includes the response by the network device to the second random access preamble sent by the second terminal device.

Optionally, in some embodiments, the specific period is configured by the network device or determined according to a modification period of system information.

The method embodiments of the present application are described in detail above with reference to FIGS. 2 to 5, and the device embodiments of the present application are described in detail below with reference to FIGS. 6 to 9. It should be understood that the device embodiments and the method embodiments correspond to each other, and similar description may be referred to the method embodiment.

FIG. 6 shows a schematic block diagram of a terminal device 600 according to an embodiment of the present application. As shown in FIG. 6, the terminal device 600 includes:

a communication module 610, configured to send a first random access preamble to a network device, and receive a media access control (MAC) protocol data unit (PDU) sent by the network device, where the MAC PDU includes at least one random access response (RAR); and a determining module 620, configured to determine system information to be sent by the network device according to the at least one RAR.

Optionally, in some embodiments, the terminal device 600 further includes:

a decoding module, configured to decode the MAC PDU according to a specific random access radio network temporary identification (RA-RNTI).

Optionally, in some embodiments, the specific RA-RNTI is a reserved RA-RNTI configured by the network device.

Optionally, in some embodiments, the specific RA-RNTI is configured by the network device through system information or radio resource control (RRC) signaling.

Optionally, in some embodiments, the at least one RAR includes indication information, and the indication information is used to indicate system information to be sent by the network device.

Optionally, in some embodiments, the determining module 620 is specifically configured to:

determine system information to be sent by the network device according to the indication information included in the at least one RAR.

Optionally, in some embodiments, the indication information is at least one random access preamble identifier (RAPID), where each RAPID in the at least one RAPID is used to indicate at least one system information.

Optionally, in some embodiments, the MAC PDU includes at least one MAC subPDU, the at least one MAC subPDU corresponds to the at least one RAR, each RAPID is carried in a subheader of MAC subPDU corresponding to each RAR, and the MAC subPDU does not include a payload part.

Optionally, in some embodiments, the indication information indicates system information to be sent by the network device in a bitmap manner.

Optionally, in some embodiments, the indication information is carried in a payload part of the MAC subPDU.

Optionally, in some embodiments, the subheader of the MAC subPDU further includes a RAPID, which is used to indicate a random access preamble corresponding to the at least one RAR.

Optionally, in some embodiments, the communication module 610 is further configured to:

send the first random access preamble to the network device within a specific period.

Optionally, in some embodiments, the specific period is configured by the network device or determined according to a modification period of system information.

Optionally, in some embodiments, the first random access preamble is used to indicate system information that the terminal device requests to acquire.

It should be understood that the terminal device 600 according to the embodiments of the present application may correspond to the terminal device in the method embodiments of the present application, and the above and other operations and/or functions of each unit in the terminal device 600 are to implement the corresponding processes of the terminal device in the method 200 shown in FIG. 2 respectively, which are not repeated here for brevity.

FIG. 7 is a schematic block diagram of a network device according to an embodiment of the present application. The network device 700 of FIG. 7 includes:

a communication module 710, configured to receive a first random access preamble sent by a first terminal device, where the first random access preamble is used to request system information; and reply a media access control (MAC) protocol data unit (PDU), where the MAC PDU includes at least one random access response (RAR), and the at least one RAR is configured to determine system information to be sent by the network device.

Optionally, in some embodiments, the at least one RAR includes indication information, and the indication information is used to indicate system information to be sent by the network device.

Optionally, in some embodiments, the indication information is at least one RAPID, where each RAPID in the at least one RAPID is used to indicate at least one system information.

Optionally, in some embodiments, the MAC PDU includes at least one MAC subPDU, the at least one MAC subPDU corresponds to the at least one RAR, each RAPID is carried in a subheader of MAC subPDU corresponding to each RAR, and the MAC subPDU does not include a payload part.

Optionally, in some embodiments, the indication information indicates system information to be sent by the network device in a bitmap manner.

Optionally, in some embodiments, the indication information is carried in a payload part of the MAC subPDU.

Optionally, in some embodiments, the subheader of the MAC subPDU further includes a RAPID, which is used to indicate a random access preamble corresponding to the at least one RAR.

Optionally, in some embodiments, the network device further includes:

an encoding module, configured to encode the MAC PDU according to a specific random access radio network temporary identification (RA-RNTI).

Optionally, in some embodiments, the communication module 710 is further configured to:

receive a first random access preamble sent by the first terminal device within a specific period.

Optionally, in some embodiments, the communication module 710 is specifically configured to:

receive a second random access preamble sent by a second terminal device within the specific period, where the second random access preamble is used to request system information, and the at least one RAR includes a response by the network device to the second random access preamble sent by the second terminal device.

Optionally, in some embodiments, the specific period is configured by the network device or determined according to a modification period of system information.

Specifically, the network device 700 may correspond to (for example, may be configured on or may be) the network device described in the foregoing method 500, and each module or unit in the network device 700 is respectively configured to execute each action or process performed by the network device in the foregoing method 500, which is omitted here to avoid detailed description.

Figure 8:
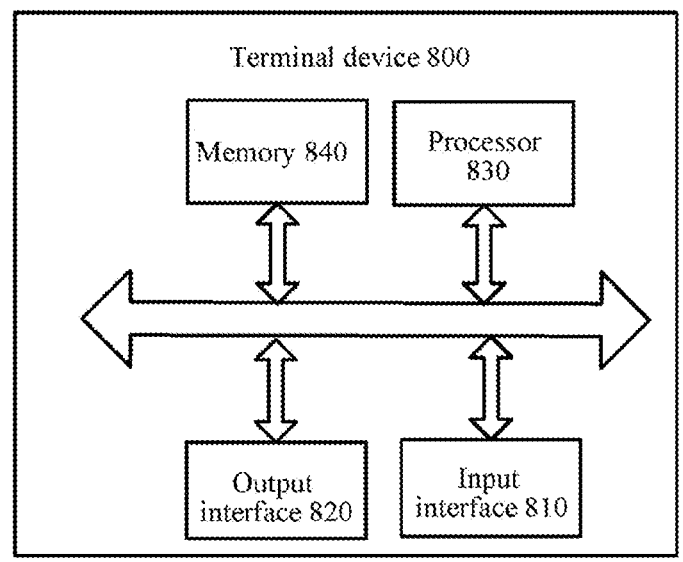
FIG. 8 shows a schematic block diagram of a terminal device according to an embodiment of the present application.

As shown in FIG. 8, an embodiment of the present application further provides a terminal device 800. The terminal device 800 may be the terminal device 600 in FIG. 6, which can be used to execute the contents of the terminal device corresponding to the method 200 in FIG. 2. The terminal device 800 includes: an input interface 810, an output interface 820, a processor 830, and a memory 840. The input interface 810, the output interface 820, the processor 830, and the memory 840 may be connected through a bus system. The memory 840 is configured to store a program, an instruction, or a code. The processor 830 is configured to execute the program, the instruction, or the code in the memory 840 to control the input interface 810 to receive signals, control the output interface 820 to send signals, and complete operations in the foregoing method embodiments.

It should be understood that, in the embodiments of the present application, the processor 830 may be a Central Processing Unit ("CPU"), and the processor 830 may also be other general-purpose processor or digital signal processor (DSP), application specific integrated circuit (ASIC), field programmable gate array (FPGA) or other programmable logic devices, discrete gate or transistor logic devices, discrete hardware components, etc. The general-purpose processor may be a microprocessor or the processor may be any conventional processor or the like.

The memory 840 may include a read-only memory and a random access memory, and provide instructions and data to the processor 830. A part of the memory 840 may further include a non-volatile random access memory. For example, the memory 840 may also store information of a device type.

In the implementation process, each content of the above method may be completed by an integrated logic circuit of hardware in the processor 830 or an instruction in a software form. The content of the method disclosed in combination with the embodiments of the present application may be directly executed by a hardware processor, or executed and completed by a combination of hardware and software modules in the processor. The software module may be located in a mature storage medium such as a random access memory, a flash memory, a read-only memory, a programmable read-only memory, or an electrically erasable programmable memory, a register, and the like. The storage medium is located in the memory 840, and the processor 830 reads the information in the memory 840 and completes the content of the foregoing method in combination with its hardware. To avoid repetition, it will not be described in detail here.

In a specific implementation manner, the determining module 620 and the decoding module included in the terminal device 600 in FIG. 6 may be implemented by using the processor 830 of FIG. 8, and the communication module 610 included in the terminal device 600 in FIG. 6 may be implemented by using the input interface 810 and the output interface 820 of FIG. 8.

Figure 9:
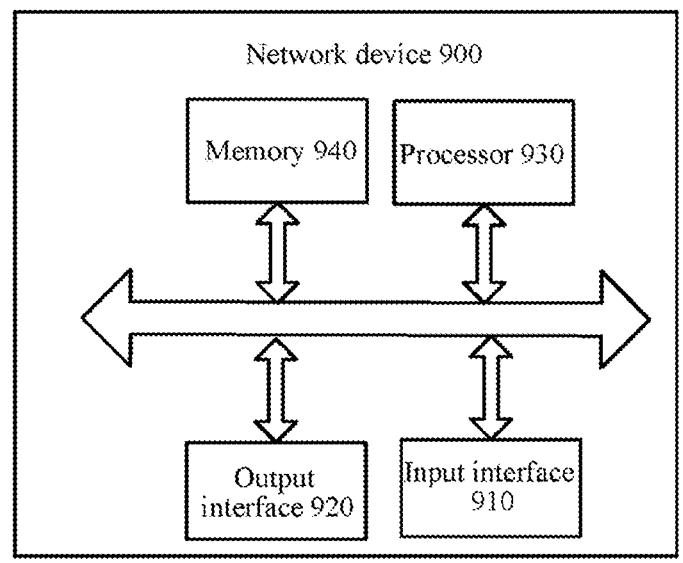
FIG. 9 shows a schematic block diagram of a network device according to another embodiment of the present application.

As shown in FIG. 9, the embodiment of the present application further provides a network device 900. The network device 900 may be the network device 700 in FIG. 7, which can be used to execute the contents of the network device corresponding to the method 500 in FIG. 5. The network device 900 includes: an input interface 910, an output interface 920, a processor 930, and a memory 940. The input interface 910, the output interface 920, the processor 930, and the memory 940 may be connected through a bus system. The memory 940 is configured to store a program, an instruction, or a code. The processor 930 is configured to execute the program, the instruction, or the code in the memory 940 to control the input interface 910 to receive signals, control the output interface 920 to send signals, and complete operations in the foregoing method embodiments.

It should be understood that, in the embodiments of the present application, the processor 930 may be a Central Processing Unit ("CPU"), and the processor 930 may also be other general-purpose processor or digital signal processor (DSP), application specific integrated circuit (ASIC), field programmable gate array (FPGA) or other programmable logic devices, discrete gate or transistor logic devices, discrete hardware components, etc. The general-purpose processor may be a microprocessor or the processor may be any conventional processor or the like.

The memory 940 may include a read-only memory and a random access memory, and provide instructions and data to the processor 930. A part of the memory 940 may further include a non-volatile random access memory. For example, the memory 940 may also store information of a device type.

In the implementation process, each content of the foregoing method may be completed by using an integrated logic circuit of hardware in the processor 930 or an instruction in the form of software. The content of the method disclosed in combination with the embodiments of the present application can be directly embodied as being executed by a hardware processor, or executed and completed by a combination of hardware and software modules in the processor. The software module may be located in a mature storage medium such as a random access memory, a flash memory, a read-only memory, a programmable read-only memory, or an electrically erasable programmable memory, a register, and the like. The storage medium is located in the memory 940, and the processor 930 reads the information in the memory 940 and completes the content of the foregoing method in combination with its hardware. To avoid repetition, it will not be described in detail here.

In a specific implementation manner, the communication module 710 included in the network device 700 in FIG. 7 may be implemented by using the input interface 910 and the output interface 920 of FIG. 9, and the coding module included in the network device 700 in FIG. 7 may be implemented by using the processor 930 in FIG. 9.

An embodiment of the present application further provides a computer-readable storage medium, where the computer-readable storage medium stores one or more programs, the one or more programs include instructions, and the instructions, when being executed by a portable electronic device including multiple application programs, cause the portable electronic device to execute the methods in the embodiments shown in FIG. 2 to FIG. 5.

An embodiment of the present application further provides a computer program, where the computer program includes instructions, and when the computer program is executed by a computer, the computer can execute a corresponding process of the methods in the embodiments shown in FIG. 2 to FIG. 5.

Those of ordinary skill in the art may realize that the units and algorithm steps of each example described in connection with the embodiments disclosed herein can be implemented by electronic hardware, or a combination of computer software and electronic hardware. Whether these functions are performed in hardware or software depends on the specific application and design constraints of the technical solution. Professional technicians can use different methods to implement the described functions for each specific application, but such implementation should not be considered to be beyond the scope of this application.

Those skilled in the art can clearly understand that, for the convenience and brevity of description, the specific working processes of the systems, devices, and units described above can refer to the corresponding processes in the foregoing method embodiments, and are not repeated here.

In the several embodiments provided in this application, it should be understood that the disclosed systems, devices, and methods may be implemented in other ways. For example, the device embodiments described above are only schematic. For example, the division of the unit is only a logical function division. In actual implementation, there may be another division manner. For example, multiple units or components may be combined or may be integrated into another system, or some features can be ignored or not implemented. In addition, the displayed or discussed mutual coupling or direct coupling or communication connection may be indirect coupling or communication connection through some interfaces, devices or units, which may be electrical, mechanical or other forms.

The units described as separate components may or may not be physically separated, and the components displayed as units may or may not be physical units, may be located in one place, or may be distributed on multiple network units. Some or all of the units may be selected according to actual needs to achieve the objective of the solution of the embodiment.

In addition, each functional unit in each embodiment of the present application may be integrated into one processing unit, or each of the units may exist separately physically, or two or more units may be integrated into one unit.

The functions may also be stored in a computer-readable storage medium if being implemented in the form of a software functional unit and sold or used as an independent product. Based on such understanding, the essence of the technical solutions according to the embodiments of the present disclosure, or the part contributing to the prior art or present disclosure, all or a part of the technical solutions, may be embodied in the form of a software product. The computer software product is stored in a storage medium including a number of instructions such that a computer device (which may be a personal computer, a server, or a network device, etc.) performs all or a part of steps of the method described in each of the embodiments of the present disclosure. The foregoing storage medium includes: any medium that is capable of storing program codes such as a USB flash drive, a removable hard disk, a read-only memory, a random access memory, a magnetic disk, or an optical disk.

The above is only a specific implementation of this application, but the scope of protection of this application is not limited to this. Any person skilled in the art can easily think of changes or replacements within the technical scope disclosed in this application. It should be covered by the protection scope of this application. Therefore, the protection scope of this application shall be subject to the protection scope of the claims.

What is claimed is:

1. A method for determining system information, comprising:
   receiving, by a network device, a first random access preamble sent by a first terminal device;
   determining, by the network device, that the first random access preamble sent within a specific period is configured to request to acquire system information, and that the first random access preamble sent outside of the specific period is configured to perform a normal random access process; and
   replying, by the network device, to a Media Access Control (MAC) protocol data unit (PDU), wherein the MAC PDU comprises at least one MAC subPDU, wherein the at least one MAC subPDU comprises a first type MAC subPDU, and the first type MAC subPDU comprises a random access preamble identifier (RAPID) and does not comprise MAC random access response (RAR), wherein the at least one MAC subPDU comprises a third type MAC subPDU, and the third type MAC subPDU comprises a backoff Indicator (BI), and wherein the RAPID in the first type MAC subPDU is configured to determine the system information to be sent by the network device.

2. The method according to claim 1, wherein the RAPID is carried in a subheader of the first type MAC subPDU.

3. The method according to claim 1, further comprising:
   encoding, by the network device, the MAC PDU according to a specific random access radio network temporary identification (RA-RNTI).

4. An apparatus in a network device, comprising:
   a processor and a memory storing program instructions;
   wherein when the program instructions are executed by the processor, the apparatus is configured to:
   receive a first random access preamble sent by a first terminal device;
   determine that the first random access preamble being sent within a specific period is configured to request system information, and that the first random access preamble sent outside of the specific period is configured to perform a normal random access process; and
   reply to a media access control (MAC) protocol data unit (PDU), wherein the MAC PDU comprises at least one MAC subPDU, wherein the at least one MAC subPDU comprises a first type MAC subPDU, and the first type MAC subPDU comprises a random access preamble identifier (RAPID) and does not comprise MAC random access response (RAR), wherein the at least one MAC subPDU comprises a third type MAC subPDU, and the third type MAC subPDU comprises a backoff Indicator (BI), and wherein the RAPID in the first type MAC subPDU is configured to determine the system information to be sent by the network device.

5. The apparatus according to claim 4, wherein the RAPID is carried in a subheader of the first type MAC subPDU.

6. The apparatus according to claim 4, wherein the processor is further configured to:
   encode the MAC PDU according to a specific random access radio network temporary identification (RA-RNTI).

\* \* \* \* \*